(12) United States Patent
Ballard et al.

(10) Patent No.: US 8,140,572 B1
(45) Date of Patent: Mar. 20, 2012

(54) SYSTEM, METHOD AND COMPUTER PROGRAM PRODUCT FOR AGGREGATING ON-DEMAND DATABASE SERVICE DATA

(75) Inventors: Alan Ballard, Vancouver (CA); Eric Bezar, Oakland, CA (US); Lars Hofhansl, San Francisco, CA (US); Mary Scotton, Oakland, CA (US); Eric Wilson, San Francisco, CA (US); Simon Wong, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 588 days.

(21) Appl. No.: 12/175,973

(22) Filed: Jul. 18, 2008

Related U.S. Application Data

(60) Provisional application No. 60/950,808, filed on Jul. 19, 2007.

(51) Int. Cl.
*G06F 17/30* (2006.01)

(52) U.S. Cl. ........................ 707/776; 707/778

(58) Field of Classification Search .................. 707/776, 707/778
See application file for complete search history.

(56) References Cited

U.S. PATENT DOCUMENTS

| | | | |
|---|---|---|---|
| 5,822,751 A * | 10/1998 | Gray et al. | 707/999.003 |
| 6,748,384 B1 * | 6/2004 | Rylander et al. | 707/812 |
| 7,209,929 B2 | 4/2007 | Dominguez, Jr. et al. | 707/103 |
| 7,657,471 B1 * | 2/2010 | Sankaran et al. | 705/35 |
| 2002/0199024 A1 * | 12/2002 | Givoly et al. | 709/248 |
| 2003/0233321 A1 * | 12/2003 | Scolini et al. | 705/40 |
| 2003/0233404 A1 | 12/2003 | Hopkins | 709/203 |
| 2004/0215626 A1 * | 10/2004 | Colossi et al. | 707/100 |
| 2005/0065925 A1 | 3/2005 | Weissman et al. | 707/4 |
| 2005/0223022 A1 | 10/2005 | Weissman et al. | 707/102 |
| 2005/0283478 A1 | 12/2005 | Choi et al. | 707/9 |
| 2006/0085444 A1 * | 4/2006 | Sarawgi et al. | 707/100 |
| 2006/0206834 A1 | 9/2006 | Fisher et al. | 715/777 |
| 2006/0294087 A1 * | 12/2006 | Mordvinov | 707/4 |
| 2008/0021893 A1 * | 1/2008 | Bakalash et al. | 707/4 |

OTHER PUBLICATIONS

U.S. Appl. No. 60/828,192, filed Oct. 4, 2006.
U.S. Appl. No. 10/817,161, filed Apr. 2, 2004.

* cited by examiner

*Primary Examiner* — Rehana Perveen
*Assistant Examiner* — Tiffany Thuy Bui
(74) *Attorney, Agent, or Firm* — Zilka-Kotab, PC

(57) ABSTRACT

In accordance with embodiments, there are provided mechanisms and methods for aggregating on-demand database service data. These mechanisms and methods for aggregating on-demand database service data can enable embodiments to more flexibly summarize data. The ability of embodiments to provide such feature may lead to enhanced aggregation features which may be used for providing more effective ways of summarizing data.

17 Claims, 11 Drawing Sheets

SYSTEM, METHOD AND COMPUTER PROGRAM PRODUCT FOR AGGREGATING ON-DEMAND DATABASE SERVICE DATA

CLAIM OF PRIORITY

This application claims the benefit of U.S. Provisional Patent Application 60/950,808 entitled "ROLL UP SUMMARY FIELD (RSF) FUNCTIONAL SPEC AND PROTOTYPE," by Alan Ballard et al., filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to summarizing data in database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to flexibly implement various functionality in the foregoing database frameworks. To provide such functionality, providers of such database systems must generally build-in the functionality themselves. One example of such functionality is the ability to summarize data of the database system.

BRIEF SUMMARY

In accordance with embodiments, there are provided mechanisms and methods for aggregating on-demand database service data. These mechanisms and methods for aggregating on-demand database service data can enable embodiments to more flexibly summarize data. The ability of embodiments to provide such feature may lead to enhanced aggregation features which may be used for providing more effective ways of summarizing data.

In an embodiment and by way of example, a method is provided for receiving a summary definition including a function for summarizing data and information specifying a plurality of child records of an on-demand database service. Data from the child records is aggregated to form an aggregate based on the summary definition. To this end, the aggregate may be displayed, in response to a request for viewing the aggregate.

While the present invention is described with reference to an embodiment in which techniques for aggregating on-demand database service data are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for aggregating on-demand database service data.

It is often desired to flexibly implement various functionality in the foregoing database framework's. To provide such functionality, providers of such database systems may either build-in the functionality themselves or provide the user the ability to customize the framework to accomplish the same. One example of enhanced functionality is the ability to summarize data of the database system. Thus, mechanisms and methods provided herein for aggregating on-demand database service data can enable embodiments to more flexibly summarize data. The ability of embodiments to provide such feature may lead to enhanced aggregation features which may be used for providing more effective ways of summarizing data.

Next, mechanisms and methods for aggregating on-demand database service data will be described with reference to exemplary embodiments.

Figure 1:
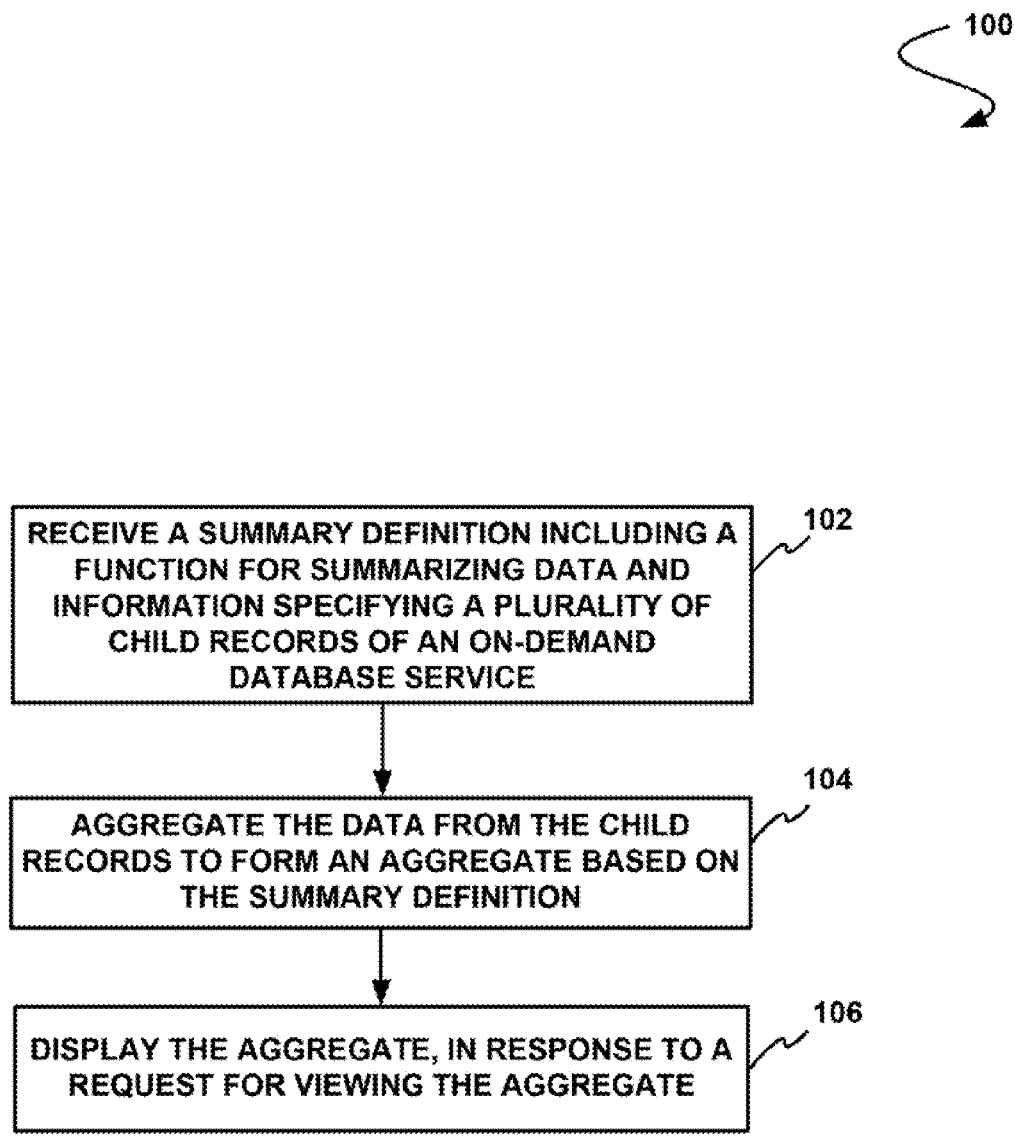
FIG. 1 shows a method for aggregating on-demand database service data, in accordance with one embodiment.

FIG. 1 shows a method 100 for aggregating on-demand database service data, in accordance with one embodiment. As shown, a summary definition including a function for summarizing data and information specifying a plurality of child records of an on-demand database service is received. See operation 102.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Further, in the context of the present description, a summary definition refers to any definition for summarizing data. For example, in one embodiment, the summary definition may include at least one function for summarizing data and master/detail information specifying a plurality of child records. In another embodiment, the summary definition may include at least one rule or filter specifying a subset of the child records to be aggregated in the summary. Additionally, the summary definition may be associated with a roll-up summary field and/or a parent record associated with a child record. In this case, child records refer to any records that are categorized under a parent record.

Further, in the context of the present description, a roll-up summary field refers to any field type that aggregates a record count or field value from related child records. For example, in one embodiment, the roll-up summary field may include a custom account field titled "Total Number of Contacts" that displays a record count of the total number of contacts directly related to the account.

With, further reference to FIG. 1, the data from the child records is aggregated to form an aggregate based on the summary definition. See operation 104. Additionally, the aggregate is displayed, in response to a request for viewing the aggregate. See operation 106.

It should be noted that the summary definition may be created independently of the aggregating. In one embodiment, the summary definition may be created by a system administrator on behalf of a community of users. Because the summary definitions may be pre-created, the aggregation may be performed in advance of the request to display the value.

Thus, the aggregating may be performed, at least in part, before the request is received. In one embodiment, a first portion of the aggregating may be performed before the request is received, and a second portion of the aggregating may be performed after the request is received. Additionally, the aggregating may be performed in response to a change in the data of the child records or a change in the summary definition.

In one embodiment, the data of only the specified child records may be aggregated. As an option, the specified child records for summarization may be user selected. In this case, the specified child records may be selected utilizing a user interface. For example, a user interface may be presented to a user such that the user may select child records as part of the summary definition via a rule.

It should be noted that the function for summarizing the data and information may be based on various criteria. In one embodiment, the function for summarizing the data and information may include a formula. In this case, a parent record may include a formula populated from a summary field. For example, a formula in the parent may use a summary field as part of a calculation. In one embodiment, a formula in the parent may use a summary field to compute an average by dividing the sum of a child field (i.e. one summary field) by a count of child rows (i.e. another summary field).

As an option, the child record may include one or more formulas that are populated from the summary field. For example, a summary may be based on the results of formulas in the child records. In one embodiment, the summary may be an aggregate the product of two columns in the child record.

Additionally, the function may include various operations to facilitate the aggregating. For example, in various embodiments, the function may include a record count operation, a sum operation, a smallest value operation, a largest value operation, an average (mean) operation, a median operation, a mode operation, a standard deviation operation, etc.

In this case, a record count operation may count the number of directly related child records. For example, a custom account field tagged "Total Number of Contacts" may display a record count of the total number of contacts directly related to an account. The sum operation may add the values of a single field on directly related child records. For example, a custom account field called "Lifetime Account Value" may examine all directly related contracts of an account and add up a "Contract Value" field.

Additionally, a smallest value operation may find the lowest value of a single field on directly related child records. For example, a custom account field titled "Customer Since" may examine a "Close Date" field of all successful opportunities and display the oldest. The largest value operation may find the highest value of a single field on directly related child records. For example, a custom account field called "Highest Contract Value" may examine a "Total Contract Value" field of all related contracts and display the contract with the largest dollar amount.

It should be noted that the functions used in conjunction with the aggregation may include various datatypes. For example, the datatypes may include numeric type fields such as a number, currency, and percent, as well as date and time, etc.

As an option, the method 100 may further include determining whether there has been a change in a summary field associated with the summary definition. In this case, it may be determined whether the change requires processing of a predetermined number of parent objects, which may be part or all of the parent objects. The aggregating may then be performed in real-time based on the determination. Also, in some cases, a change in the summary field definition may require recomputing the summary field for some or all parents. In these cases, asynchronous processing may be implemented.

In one embodiment, the aggregating may be performed in real-time of the change and may require processing of less than the predetermined number of parent objects. In another embodiment, the aggregating may not be performed in real-time of the change and may require processing of less than the predetermined number of parent objects.

Figure 2:
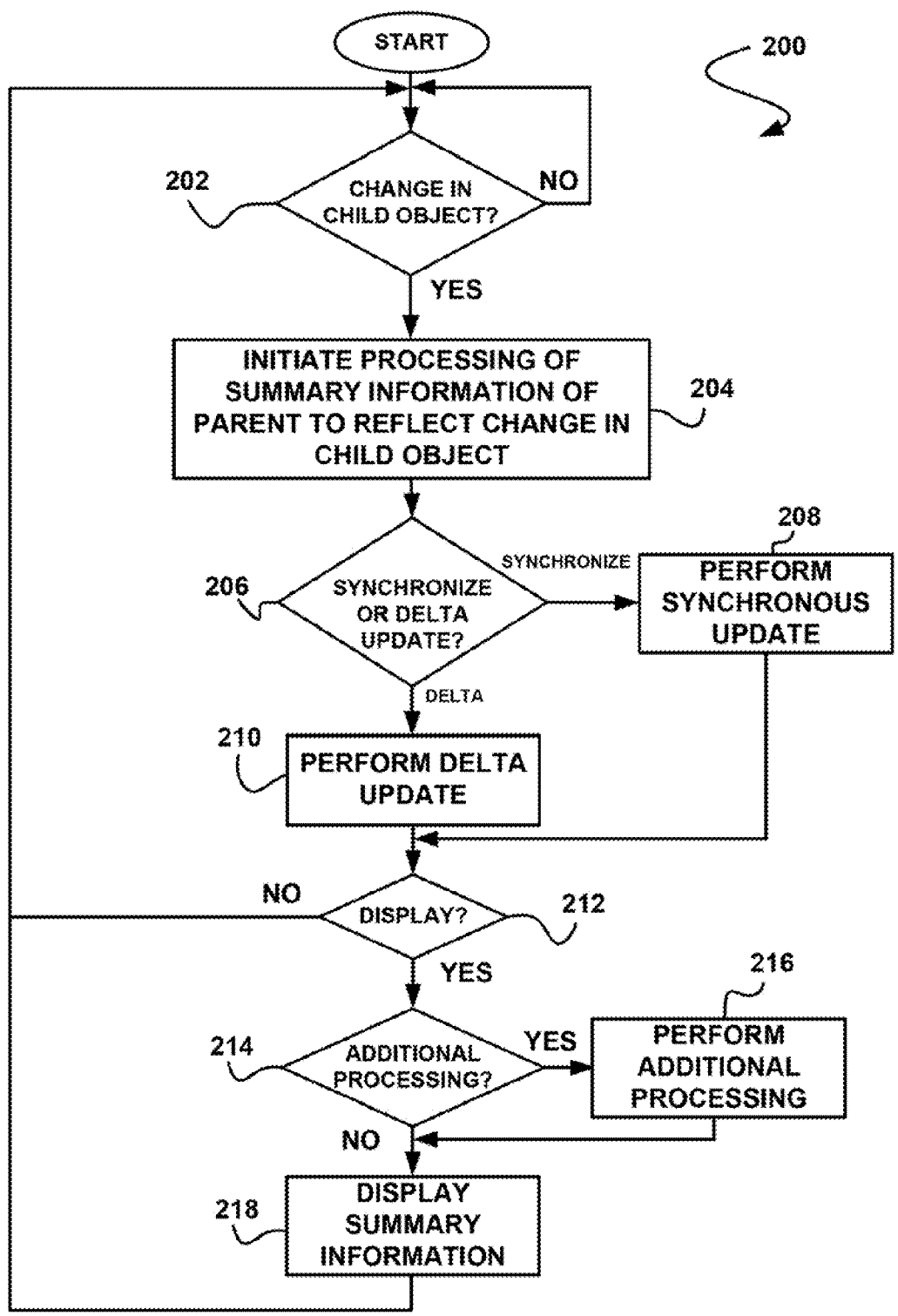
FIG. 2 shows a method for aggregating on-demand database service data, in accordance with another embodiment.

FIG. 2 shows a method 200 for aggregating on-demand database service data, in accordance with another embodiment. As an option, the present method 200 may be implemented in the context of the functionality of FIG. 1. Of course, however, the method 200 may be carried out in any desired environment. The aforementioned definitions may apply during the present description.

As shown, it is determined if there is a change in a child object (e.g. a child record). See operation 202. If there is a change in a child object, processing of summary information of a parent object is initiated to reflect the change in the child object. See operation 204.

Once the processing is initiated, it is determined whether to implement a synchronous update of the single parent or a delta update of the single parent. See operation 206. In the context of the present description, a synchronous update refers to an update where all relevant child rows may be scanned synchronously and the parent may be updated in the same transaction as the child. In this case, the parent in question may optionally be locked. Additionally, in the context of the present description, a delta update refers to an update where a single child update occurs and a new summary may be determined without scanning all child rows.

If it is determined that a synchronous update is to be performed, the synchronous update is performed. See operation 208. If it is determined that a delta update is to be performed, the delta update is performed. See operation 210.

It is then determined whether to display the summary information. See operation 212. If it is determined to display the summary information, it is further determined whether additional processing is required. See operation 214.

If additional processing is required, the processing is performed. See operation 216. The summary information is then displayed. See operation 218.

Figure 3:
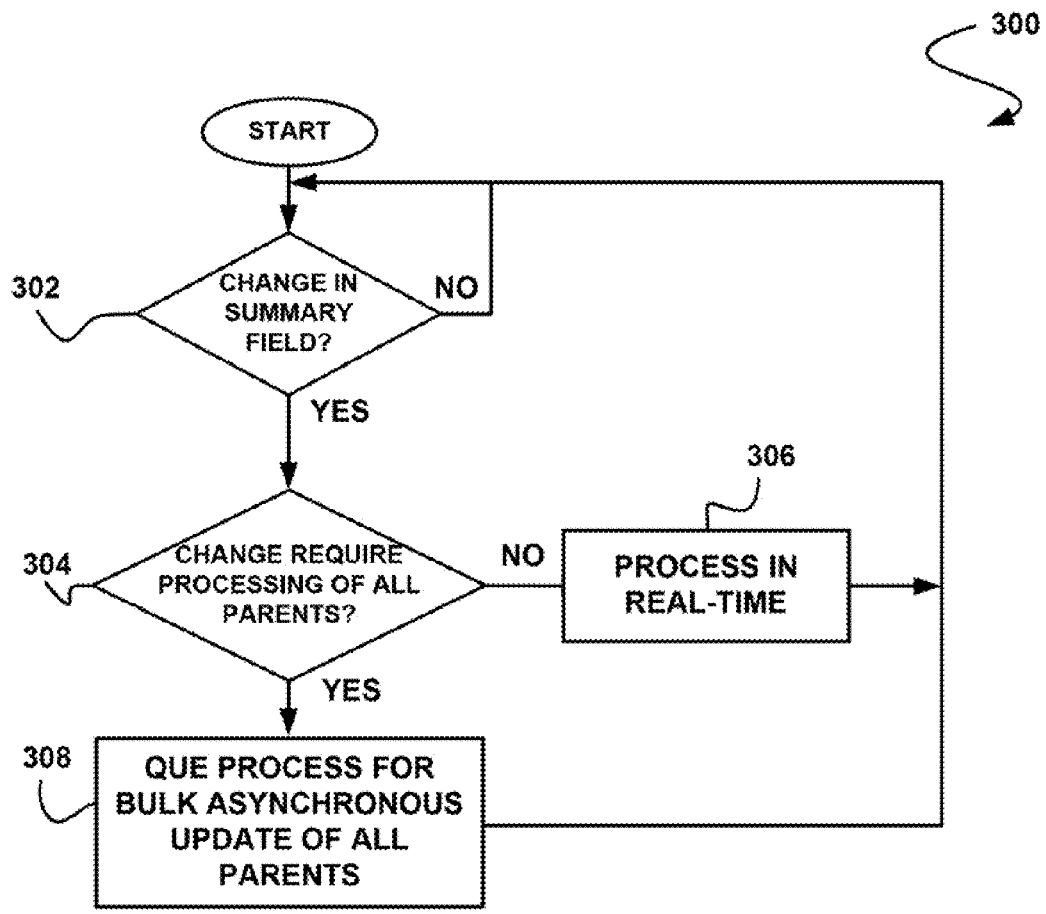
FIG. 3 shows a method for aggregating on-demand database service data, in accordance with another embodiment.

FIG. 3 shows a method 300 for aggregating on-demand database service data, in accordance with another embodiment. As an option, the present method 300 may be implemented in the context of the functionality of FIGS. 1-2. Of course, however, the method 300 may be carried out in any desired environment. Again, the aforementioned definitions may apply during the present description.

As shown, it is determined if there is a change in a summary field or summary field definition. See operation 302. If it is determined that there is a change in the summary field, it is determined whether the change requires processing of all parents. See operation 304.

If the change does not require the processing of all parents, the processing of the change, including aggregation, takes place in real-time or near real-time. See operation 306. If the change requires processing of all parents, the processing, including aggregation, is queued for a bulk asynchronous update of all parents. See operation 308.

Using the methods described herein, a new custom field type that aggregates a record count or field value from directly related master/detail child records may be displayed. In this way, summary fields may be available everywhere other fields are available, including reports, list views, and merge fields, etc. In order to work in reports and list views, the evaluated summary results may be materialized in the summary field.

In one embodiment, the three evaluation mechanisms described above may be utilized for updating summary fields. For example, a bulk asynchronous update of all parents may be implemented. In this case, the bulk update may be queued and a metadata definition of the summary field may be marked as dirty, or invalid. As an option, bulk updates may implement parent chunking to update a chunk of parent rows with their summaries of the relevant child rows. Additionally, all parents in a chunk may be locked.

As another option, the synchronous update of a single parent may be implemented, where all relevant child rows may be scanned synchronously and the parent may be updated in the same transaction as the child. As a third option, the delta update of a single parent may be implemented. If a summary field is marked as "dirty," delta updates may not be performed. Instead a synchronous single parent scan may be performed. If a single parent scan is determined to be implemented, it may always execute, regardless of the dirty or invalid bit setting.

In one embodiment, a running or scheduled bulk update task may be canceled if a new bulk update task is deemed to be caused by a bulk operation. In this case, a new bulk update task may recompute the same field and thus obsolete the previous task. The new task may be queued before the old task is removed from the queue.

When the deletion of an object cascades to objects that contribute to summaries in other objects that are not being cascaded, the summaries may be recomputed. For example, when deletion of a contact cascades to its activities, the relationship summaries should be recomputed for those activities. When un-deleting an object, all the summaries affected by the object, as well as all the cascades, may be recomputed. The list of children being undeleted is not necessarily the same as the list of children originally deleted in the first place.

In one embodiment, roll-up summary definitions may include a filter condition on the summarized rows. As an option, filters may be implemented using formulas. In one embodiment, a filter user interface may be utilized to define filters. In this case, the filter user interface may be utilized to generate Boolean formula expressions. These expressions may be used at runtime to generate SQL filter expressions and for incremental updates to evaluate the filter point-wise in memory.

Thus, filter conditions may be imposed on roll-up summary fields such that only specified child records meeting certain criteria are aggregated, as desired. For example, a custom contact field named "Number of Open Cases" may be created that could display the number of cases related to a contact, but only if cases have not yet been closed.

It should be noted that unit conversions may be performed on information to be summarized. For example, a data set may include economic data associated with various currencies. In this case, any aggregation may include converting the economic data into a common currency. In one embodiment, the common currency may be a user defined currency.

Figure 4:
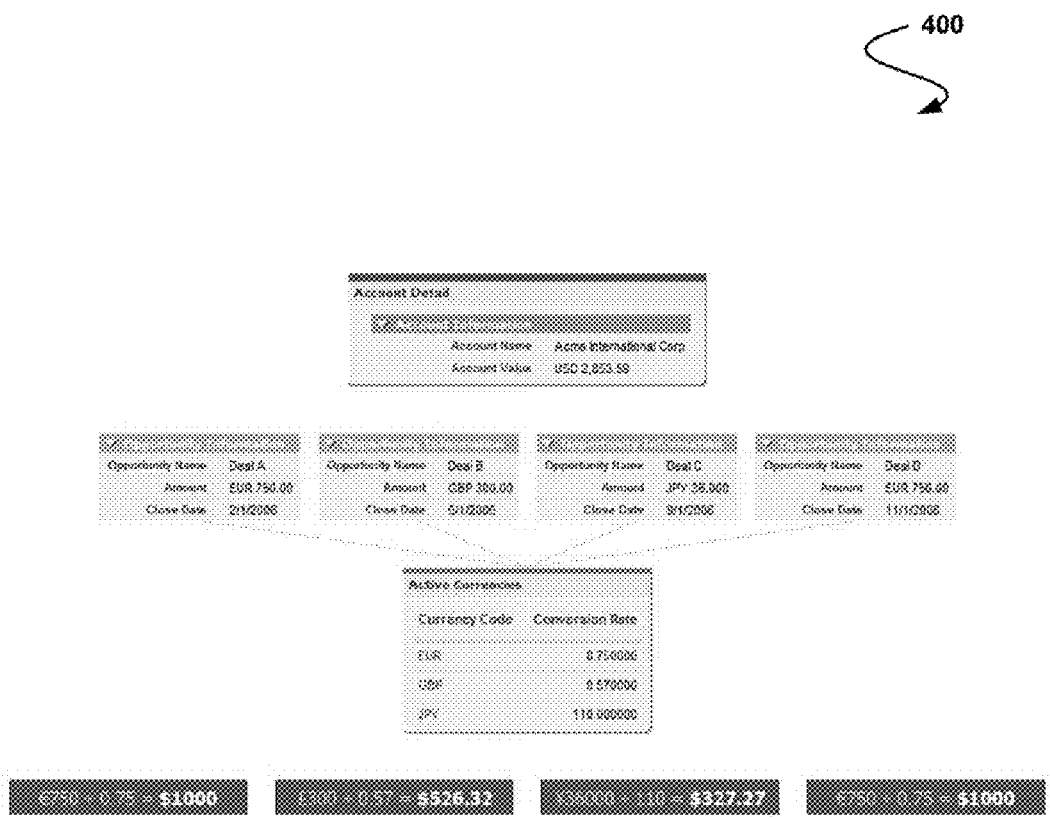
FIG. 4 shows an interface including a table for aggregating on-demand database service data when the data includes data of multiple currencies, in accordance with one embodiment.
Figure 5A:
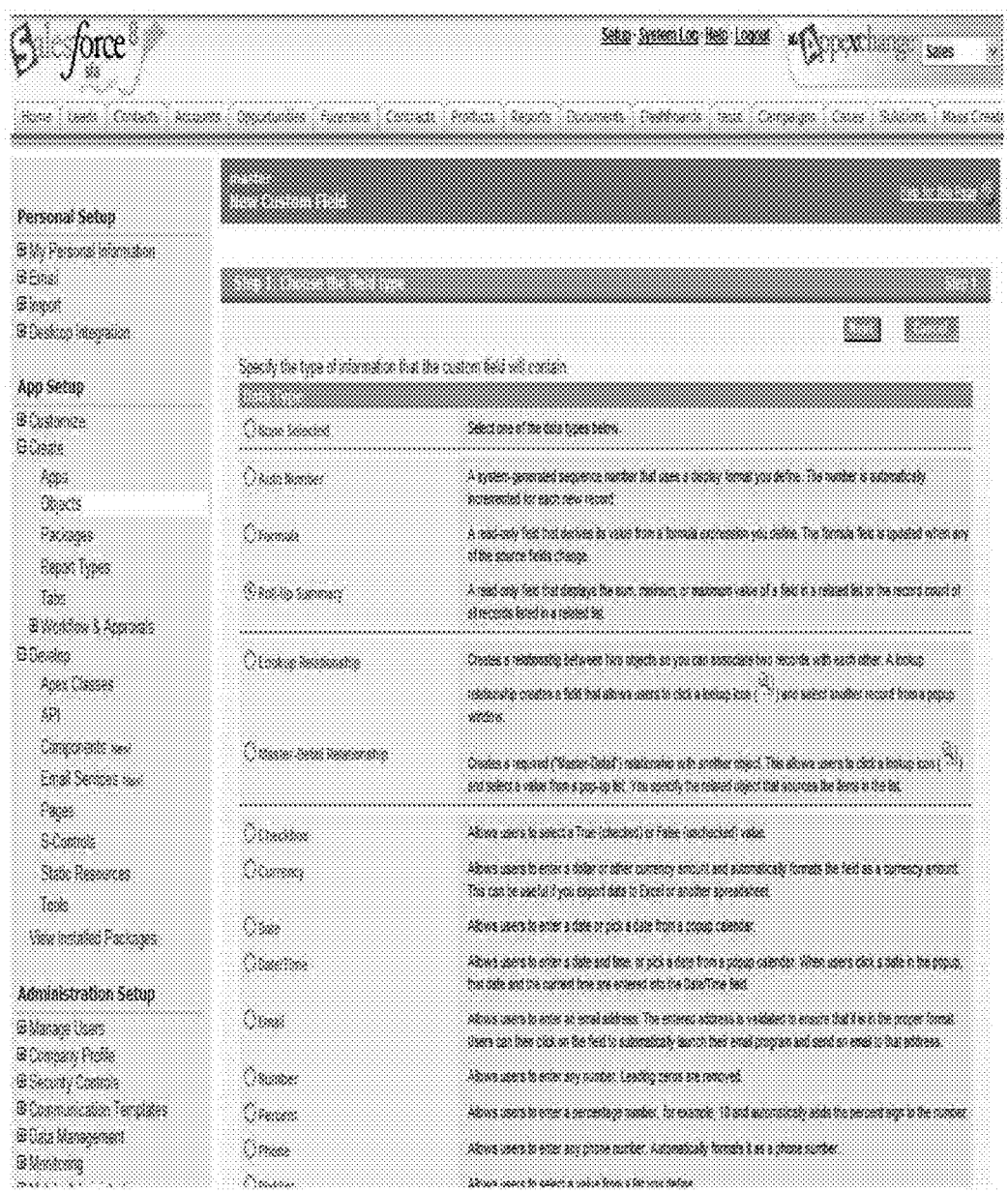
FIGS. 5A-5E show interfaces for creating a new summary field on a master-detail relationship, in accordance with one embodiment.
Figure 5B:
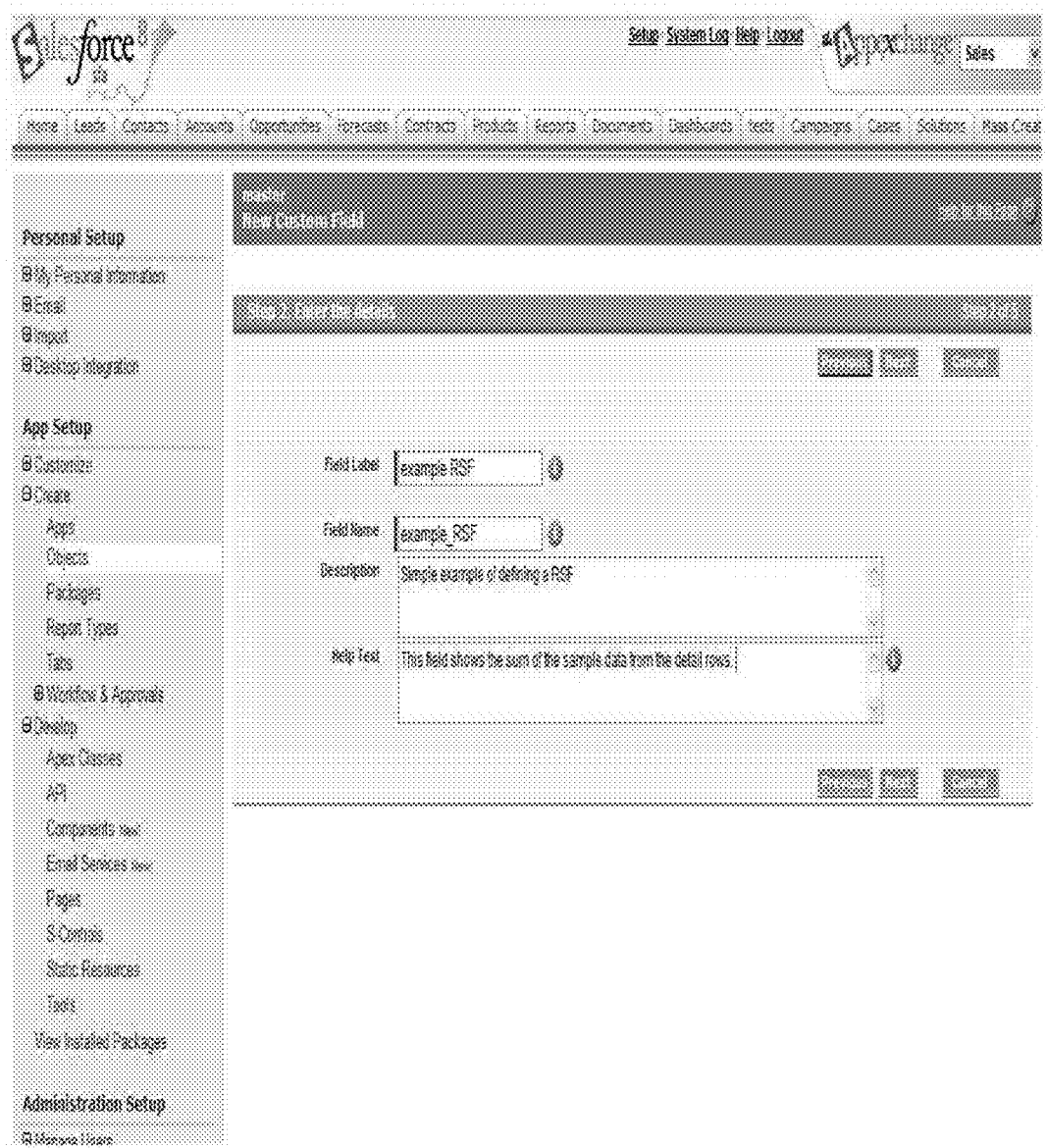
Figure 5C:
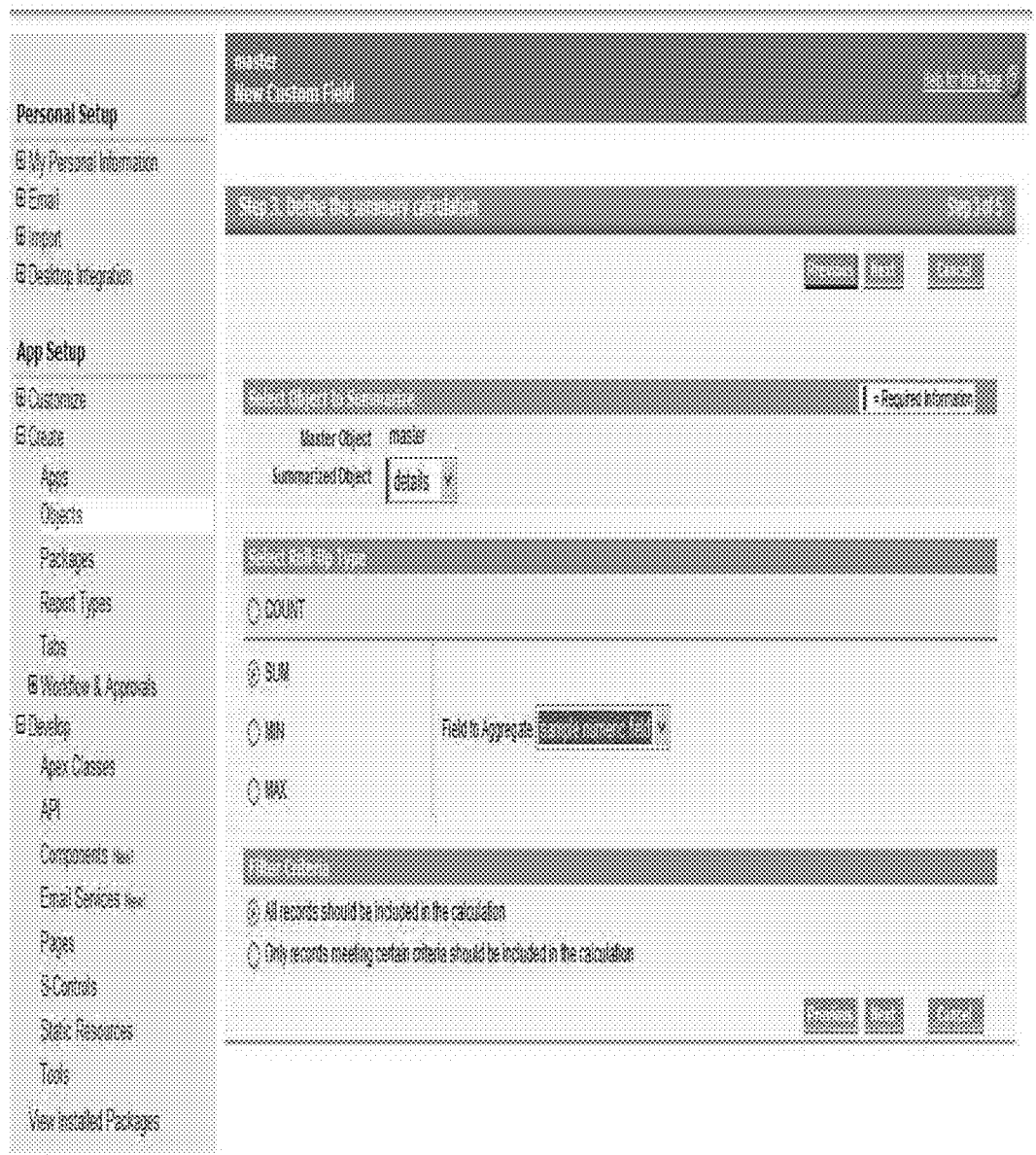
Figure 5D:
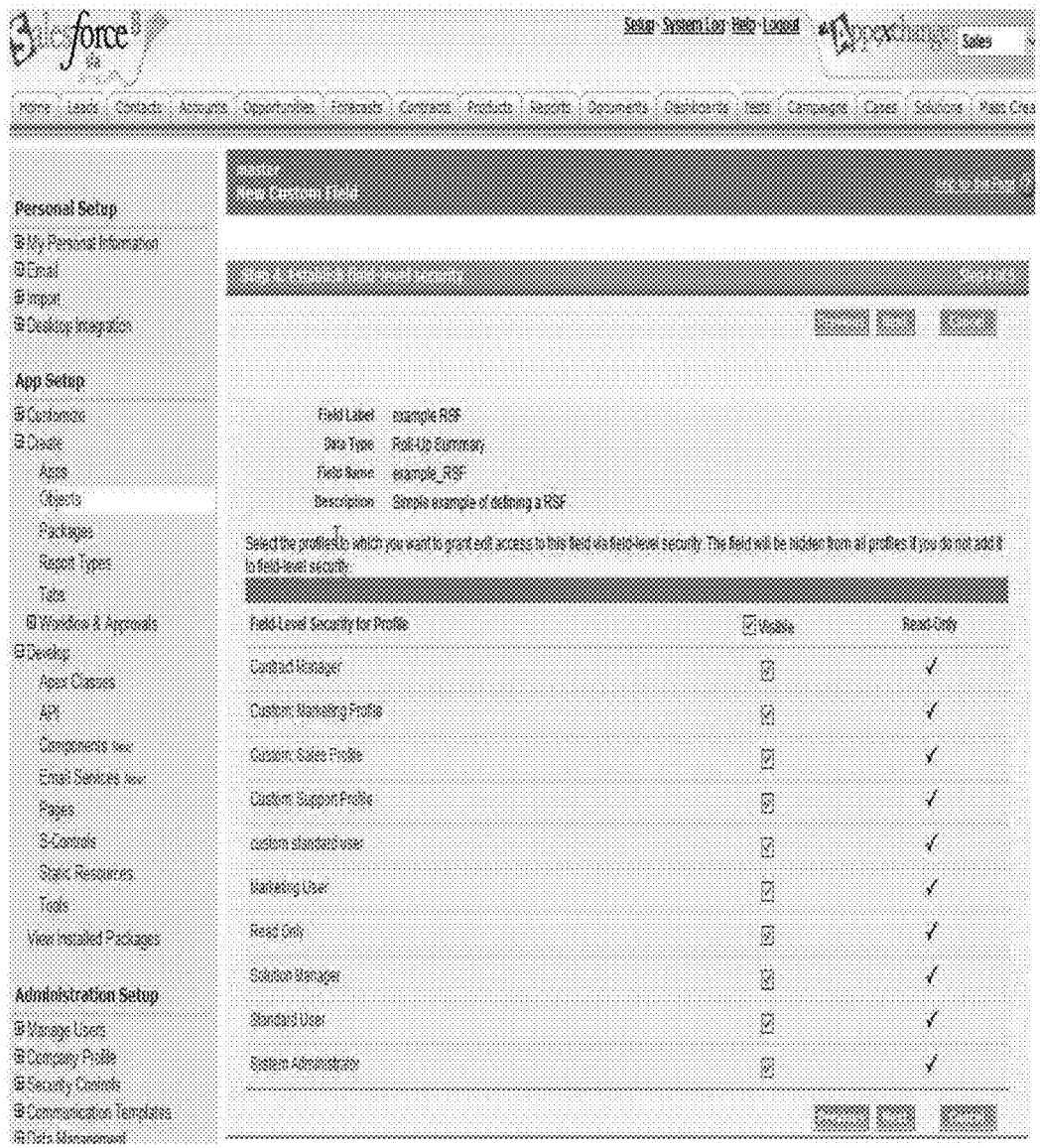
Figure 5E:
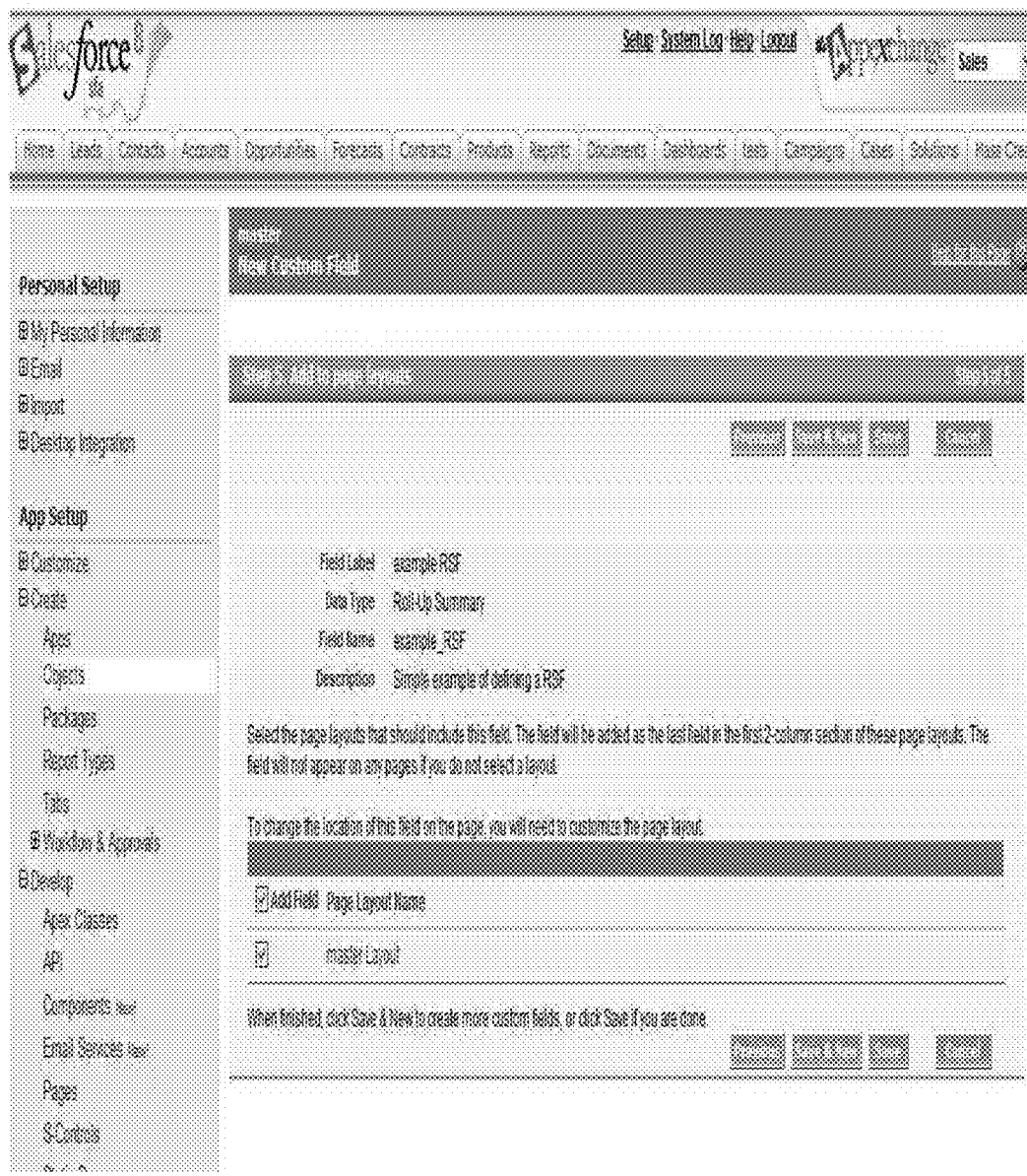

FIG. 4 shows an interface 400 including a table for aggregating on-demand database service data when the data includes data of multiple currencies, in accordance with one embodiment. As an option, the interface 400 may be implemented in the context of the functionality of FIGS. 1-3. Of course, however, the interface 400 may be implemented in any desired environment. Further, the aforementioned definitions may apply during the present description.

As shown, the interface 400 includes roll-up summary field behavior for data corresponding to different currencies. Because only one set of currency conversion rates are normally maintained for an organization, all child records may use this single conversion table for aggregating their values to the parent. As an option, the currency of the parent record may be used as the currency to which all child records will be converted.

Every time a conversion rate is updated by an administrator, a mass recalculation of all roll-up summary fields of type "currency" may optionally be triggered. On the other hand, workflow, validation, apex triggers, etc. may not be affected by this change. If the currency of the parent record is changed, a recalculation of any currency roll-up summary fields for that record may also optionally be performed. These are other cases that a bulk asynchronous recalculation of all parent rows may be performed.

FIGS. 5A-5E show interfaces for creating a new summary field on a master-detail relationship, in accordance with one embodiment. As an option, the interfaces may be implemented in the context of the functionality of FIGS. 1-4. Of course, however, the interfaces may be implemented in any desired environment. Again, the aforementioned definitions may apply during the present description.

As shown, an interface is displayed such that a user may create a custom field on an object where the field is to be displayed. See FIG. 5A. Because summary fields summarize the values from records on a related object, the object on which the field is created should be on the master side of a master-detail relationship.

To create a roll-up summary, the user may select the roll-up summary field type, and click next. Subsequently, the user may be presented with another interface where the user may enter a field label, field name, a description, and other attributes. See FIG. 5B. The user may enter a field label and any other attributes and click next to continue.

After entering the field label and other attributes, the user is presented with an interface to define a summary calculation. See FIG. 5C. Using this interface, the user may select an object on the detail side of a master-detail relationship. In this case, the object on the detail side includes the records that the user wants to aggregate.

Additionally, the user is able to select the type of summary/aggregation to implement. For example, the user may select a count operation that totals the number of related records. In other words, the count operation totals the values in the field the user selected to aggregate.

As another option, the user may select a sum operation that displays the lowest value for all directly-related records of the field the user selected to aggregate. Still yet, the user may select a min or a max operation.

Once the user has selected the type of summary/aggregation to implement, the user may enter filter criteria if a selected group of records is desired in the summary calculation. In the case that an organization of the user uses multiple languages, default filter language may be used. Once the user has selected the filter criteria, the user may select next to continue.

Upon clicking next, another interface may be displayed for establishing field-level security. See FIG. 5D. For example, the user may set the field-level security to determine whether the field should be visible for specific profiles.

Once the user has established the field-level security, the user may select next to continue. Subsequently, an interface may be displayed that allows the user to choose page layouts to display the field. See FIG. 5E. In one embodiment, the field may be added as the last field in the first two-column section on the page layout. For user custom fields, the field may be automatically added to the bottom of the user detail page. The user may then have the option to click save to finish or save and new to create more custom fields.

In this way, roll-up summary fields may calculate values from a set of related records, such as those in a related list. Roll-up summary fields may be created to automatically display a value on a master record based on the values of records in a detail record, where the detail records are directly related to the master. For example, a custom account field called "Total Invoice Amount" may display the sum of invoice amounts for all related invoice custom object records in the invoices related list on an account.

System Overview

Figure 6:
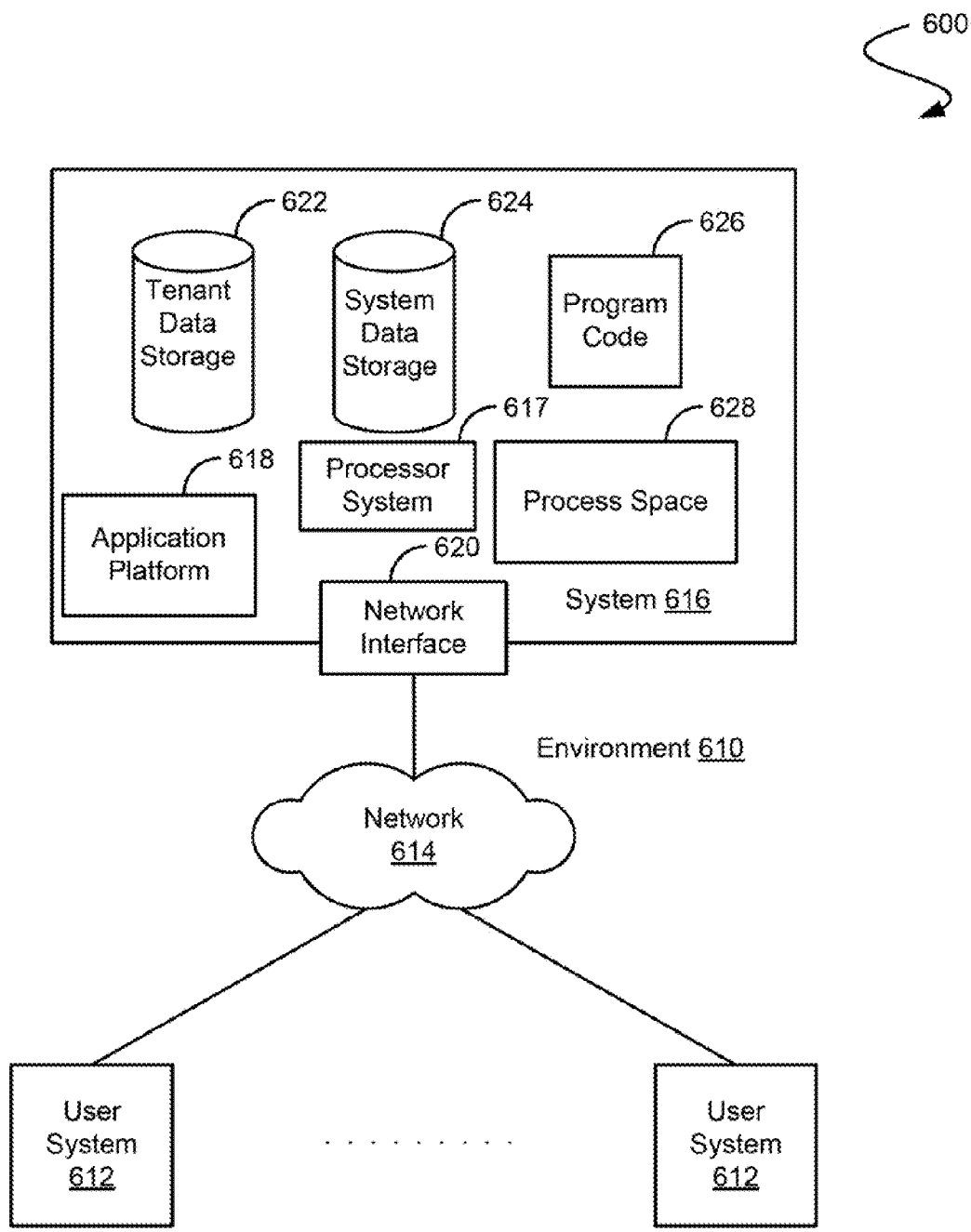
FIG. 6 illustrates a block diagram of an example of an environment wherein an on-demand database service might be used.

FIG. 6 illustrates a block diagram of an environment 610 wherein an on-demand database service might be used. As an option, any of the previously described embodiments of the foregoing figures may or may not be implemented in the context of the environment 610. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 7:
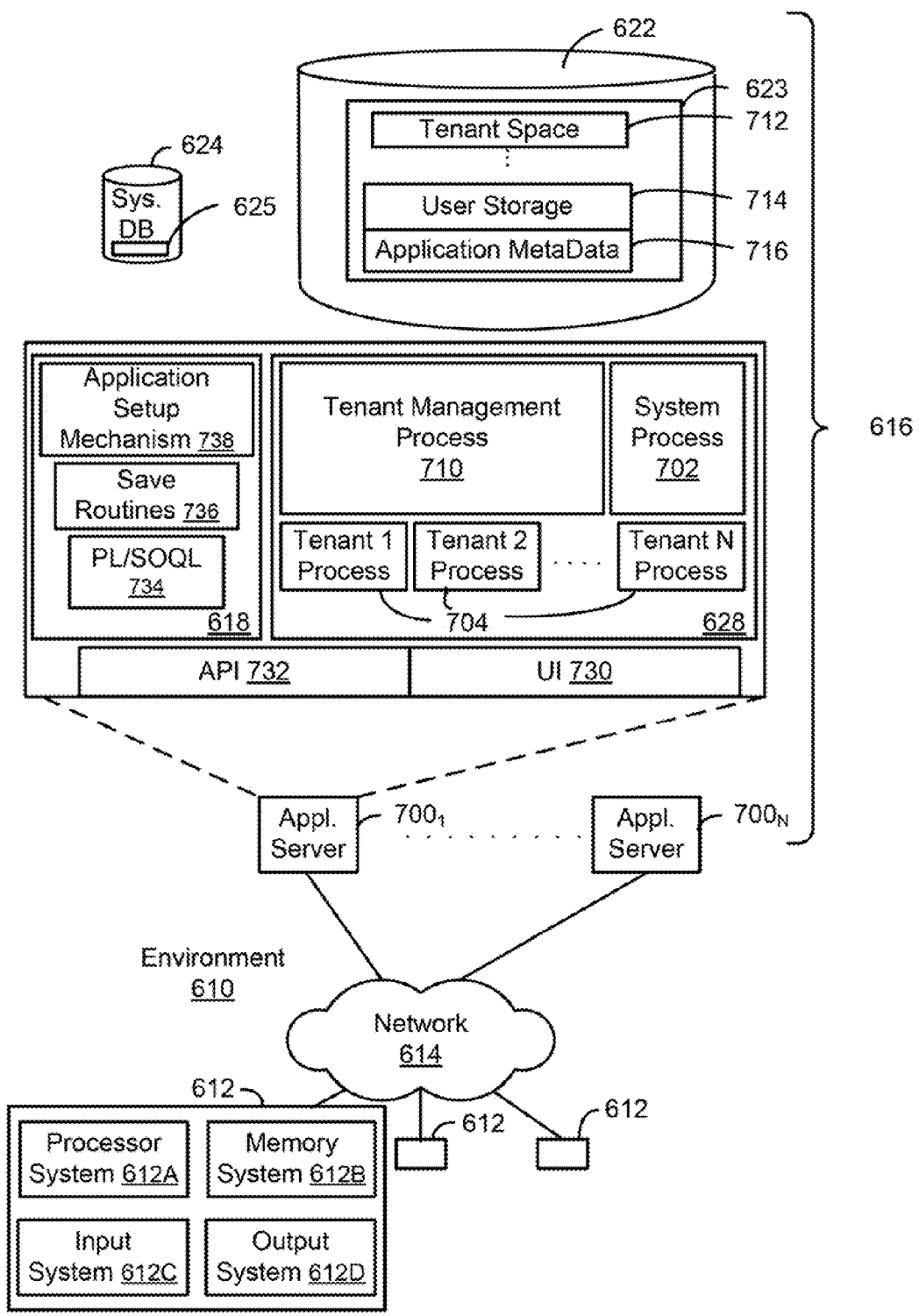
FIG. 7 illustrates a block diagram of an embodiment of elements of FIG. 6 and various possible interconnections between these elements.

One arrangement for elements of system 616 is shown in FIG. 7, including a network interface 620, application platform 618, tenant data storage 622 for tenant data 623, system data storage 624 for system data accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application (s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.)

using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Provisional Patent Application 60/828,192 entitled, "PROGRAMMING LANGUAGE METHOD AND SYSTEM FOR. EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
    receiving a summary definition including a function for summarizing data and information specifying a plurality of child records of an on-demand database service;
    aggregating the data from the child records to form an aggregate based on the summary definition, utilizing a hardware processor;
    displaying the aggregate, in response to a request for viewing the aggregate;
    wherein a first portion of the aggregating is performed before the request is received, and a second portion of the aggregating is performed after the request is received;
    wherein the summary definition is associated with a parent record having the child records, and the data from the child records is aggregated to form the aggregate based on the summary definition associated with the parent record;

wherein the summary definition is stored in a summary field of the parent record having the child records;

wherein the parent record is of an object category, and the child records are each of a sub-category of the object category, such that the child records are categorized under the parent record;

wherein the summary definition is created by:
providing to a user, by the on-demand database service, a user interface;
through the user interface, receiving a selection of the parent record by the user;
through the user interface, receiving a request to add a summary field to the selected parent record;
receiving the summary definition for the requested summary field by the user, including receiving from the user the information specifying the child records of the parent record; and
saving the received summary definition in the requested summary field of the selected parent record.

2. The method of claim 1, wherein the summary definition is associated with a roll-up summary field.

3. The method of claim 1, wherein the aggregating is performed, in response to a change in the data of the child records.

4. The method of claim 1, wherein the summary definition specifies a filter to determine the child records to be selected.

5. The method of claim 1, wherein the data of only the specified child records are aggregated.

6. The method of claim 1, wherein the child records include one or more formulas that are populated from summary fields.

7. The method of claim 1, and further comprising determining whether there has been a change in the summary field associated with the summary definition.

8. The method of claim 7, and further comprising determining whether the change requires processing of a predetermined number of parent objects.

9. The method of claim 8, wherein the predetermined number of parent objects include all of the parent objects.

10. The method of claim 8, wherein the second portion of the aggregating is performed in real-time based on the determination.

11. The method of claim 10, wherein the second portion of the aggregating is performed in real-time of the change and requires processing of less than the predetermined number of parent objects.

12. The method of claim 10, wherein the second portion of the aggregating is not performed in real-time of the change and requires processing of less than the predetermined number of parent objects.

13. The method of claim 1, wherein the on-demand database service includes a multi-tenant on-demand database service.

14. The method of claim 1, wherein the child records directly reference the parent record storing the summary definition including the function for summarizing data and the information specifying the child records.

15. A non-transitory computer readable storage medium carrying one or more sequences of instructions which, when executed by one or more processors, cause the one or more processors to carry out the steps of:
receiving a summary definition including a function for summarizing data and information specifying a plurality of child records of an on-demand database service;
aggregating the data from the child records to form an aggregate based on the summary definition;
displaying the aggregate, in response to a request for viewing the aggregate;
wherein a first portion of the aggregating is performed before the request is received, and a second portion of the aggregating is performed after the request is received;
wherein the summary definition is associated with a parent record having the child records, and the data from the child records is aggregated to form the aggregate based on the summary definition associated with the parent record;
wherein the summary definition is stored in a summary field of the parent record having the child records;
wherein the parent record is of an object category, and the child records are each of a sub-category of the object category, such that the child records are categorized under the parent record;
wherein the summary definition is created by:
providing to a user, by the on-demand database service, a user interface;
through the user interface, receiving a selection of the parent record by the user;
through the user interface, receiving a request to add a summary field to the selected parent record;
receiving the summary definition for the requested summary field by the user, including receiving from the user the information specifying the child records of the parent record; and
saving the received summary definition in the requested summary field of the selected parent record.

16. An apparatus, comprising:
a hardware processor; and
one or more stored sequences of instructions which, when executed by the processor, cause the processor to carry out the steps of:
receiving a summary definition including a function for summarizing data and information specifying a plurality of child records of an on-demand database service;
aggregating the data from the child records to form an aggregate based on the summary definition;
displaying the aggregate, in response to a request for viewing the aggregate;
wherein a first portion of the aggregating is performed before the request is received, and a second portion of the aggregating is performed after the request is received;
wherein the summary definition is associated with a parent record having the child records, and the data from the child records is aggregated to form the aggregate based on the summary definition associated with the parent record;
wherein the summary definition is stored in a summary field of the parent record having the child records;
wherein the parent record is of an object category, and the child records are each of a sub-category of the object category, such that the child records are categorized under the parent record;
wherein the summary definition is created by:
providing to a user, by the on-demand database service, a user interface;
through the user interface, receiving a selection of the parent record by the user;
through the user interface, receiving a request to add a summary field to the selected parent record;

receiving the summary definition for the requested summary field by the user, including receiving from the user the information specifying the child records of the parent record; and saving the received summary definition in the requested summary field of the selected parent record.

17. A method for transmitting code for use in a multi-tenant database system on a transmission medium, the method comprising:

transmitting code for receiving a summary definition including a function for summarizing data and information specifying a plurality of child records of an on-demand database service;

transmitting code for aggregating the data from the child records to form an aggregate based on the summary definition, utilizing a hardware processor;

transmitting code for displaying the aggregate, in response to a request for viewing the aggregate;

wherein a first portion of the aggregating is performed before the request is received, and a second portion of the aggregating is performed after the request is received;

wherein the summary definition is associated with a parent record having the child records, and the data from the child records is aggregated to form the aggregate based on the summary definition associated with the parent record;

wherein the summary definition is stored in a summary field of the parent record having the child records;

wherein the parent record is of an object category, and the child records are each of a sub-category of the object category, such that the child records are categorized under the parent record;

wherein the summary definition is created by:

providing to a user, by the on-demand database service, a user interface;

through the user interface, receiving a selection of the parent record by the user;

through the user interface, receiving a request to add a summary field to the selected parent record;

receiving the summary definition for the requested summary field by the user, including receiving from the user the information specifying the child records of the parent record; and saving the received summary definition in the requested summary field of the selected parent record.

\* \* \* \* \*